United States Patent
Wang et al.

(10) Patent No.: US 9,479,045 B1
(45) Date of Patent: Oct. 25, 2016

(54) POWER SUPPLY AVOIDING AUXILIARY BOOST CIRCUIT OVER VOLTAGE

(71) Applicant: Chicony Power Technology Co., Ltd., New Taipei (TW)

(72) Inventors: Tzu-Hung Wang, New Taipei (TW); Chiuan-Shing Wu, New Taipei (TW); Yu-Wei Li, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 14/883,965

(22) Filed: Oct. 15, 2015

(51) Int. Cl.
   *H02M 1/32* (2007.01)
   *H02M 1/00* (2006.01)
   *H02M 7/04* (2006.01)
   *H02M 1/42* (2007.01)
   *H02M 1/36* (2007.01)

(52) U.S. Cl.
   CPC ............... *H02M 1/32* (2013.01); *H02M 1/36* (2013.01); *H02M 1/42* (2013.01); *H02M 7/04* (2013.01); *H02M 2001/007* (2013.01); *H02M 2001/0096* (2013.01)

(58) Field of Classification Search
   CPC .. H02M 1/32; H02M 1/36; H02M 2001/007; H02M 2001/0096
   See application file for complete search history.

(56) References Cited

U.S. PATENT DOCUMENTS

| | | | |
|---|---|---|---|
| 6,181,114 B1* | 1/2001 | Hemena | H02M 1/4225 323/222 |
| 9,397,556 B2* | 7/2016 | Wang | H02M 1/4225 |
| 2005/0030772 A1* | 2/2005 | Phadke | H02M 1/4225 363/71 |
| 2009/0091957 A1* | 4/2009 | Orr | H02M 1/4225 363/79 |
| 2011/0038189 A1* | 2/2011 | Whittam | H02J 1/00 363/84 |

* cited by examiner

*Primary Examiner* — Timothy J Dole
*Assistant Examiner* — Ishrat Jamali
(74) *Attorney, Agent, or Firm* — Muncy, Geissler, Olds & Lowe, P.C.

(57) ABSTRACT

A power supply avoiding an auxiliary boost circuit over voltage includes a direct current to direct current converting circuit, the auxiliary boost circuit and a power factor correction circuit. The auxiliary boost circuit includes a voltage detection unit, a control unit, a management unit and a boost unit. When the voltage detection unit detects that an output voltage of the power factor correction circuit is less than a predetermined voltage, the control unit enters a hold up time mode. Before the hold up time mode is finished, the control unit sends a first synchronization signal to the management unit, so that the management unit sends a second synchronization signal to the control unit, so that the control unit turns off the boost unit before or at the same time the management unit turns off the direct current to direct current converting circuit.

5 Claims, 2 Drawing Sheets

POWER SUPPLY AVOIDING AUXILIARY BOOST CIRCUIT OVER VOLTAGE

BACKGROUND OF THE INVENTION

1. Field of the Invention

The present invention relates to a power supply, and especially relates to a power supply avoiding an auxiliary boost circuit over voltage.

2. Description of the Related Art

When a related art alternating current power supply apparatus stops supplying an alternating current power to a related art power supply, an output voltage of the related art power supply will not drop to zero volt immediately. The output voltage will drop to zero volt gradually, so that a direct current to direct current converting circuit of the related art power supply and a load apparatus are protected. However, the direct current to direct current converting circuit may be still damaged by the variation of the output voltage. Therefore, the components in the direct current to direct current converting circuit must have high specifications (for example, high voltage resistance), so that the cost of the direct current to direct current converting circuit is increased.

SUMMARY OF THE INVENTION

In order to solve the above-mentioned problems, an object of the present invention is to provide a power supply avoiding an auxiliary boost circuit over voltage.

In order to achieve the object of the present invention mentioned above, the power supply comprises a direct current to direct current converting circuit, the auxiliary boost circuit, a power factor correction circuit and a rectification circuit. The direct current to direct current converting circuit outputs a direct current electric power. The auxiliary boost circuit is electrically connected to the direct current to direct current converting circuit. The power factor correction circuit is electrically connected to the auxiliary boost circuit. The rectification circuit is electrically connected to the power factor correction circuit. The auxiliary boost circuit comprises a boost unit, a voltage detection unit, a control unit, a management unit and an output side capacitor. The boost unit is electrically connected to the direct current to direct current converting circuit and the power factor correction circuit. The voltage detection unit is electrically connected to the power factor correction circuit and the boost unit. The control unit is electrically connected to the power factor correction circuit, the boost unit and the voltage detection unit. The management unit is electrically connected to the direct current to direct current converting circuit. The output side capacitor is electrically connected to the direct current to direct current converting circuit and the boost unit. When the voltage detection unit detects that an output voltage of the power factor correction circuit is less than a predetermined voltage, the control unit enters a hold up time mode to drive the boost unit to increase the output voltage to obtain a boost voltage. The output side capacitor receives the boost voltage to supply power to the direct current to direct current converting circuit. Before the hold up time mode is finished, the control unit sends a first synchronization signal to the management unit. After the management unit receives the first synchronization signal, the management unit sends a second synchronization signal to the control unit. After the control unit receives the second synchronization signal sent from the management unit, the control unit turns off the boost unit before or at the same time the management unit turns off the direct current to direct current converting circuit.

The advantage of the present invention is to turns off the auxiliary boost circuit and the direct current to direct current converting circuit at the same time. Or the auxiliary boost circuit is turned off first, and then the direct current to direct current converting circuit is turned off. Therefore, the over voltage phenomenon of the auxiliary boost circuit is eliminated, and the reliability of the power supply is improved.

DETAILED DESCRIPTION OF THE INVENTION

Please refer to following detailed description and figures for the technical content of the present invention. The following detailed description and figures are referred for the present invention, but the present invention is not limited to it.

Figure 1:
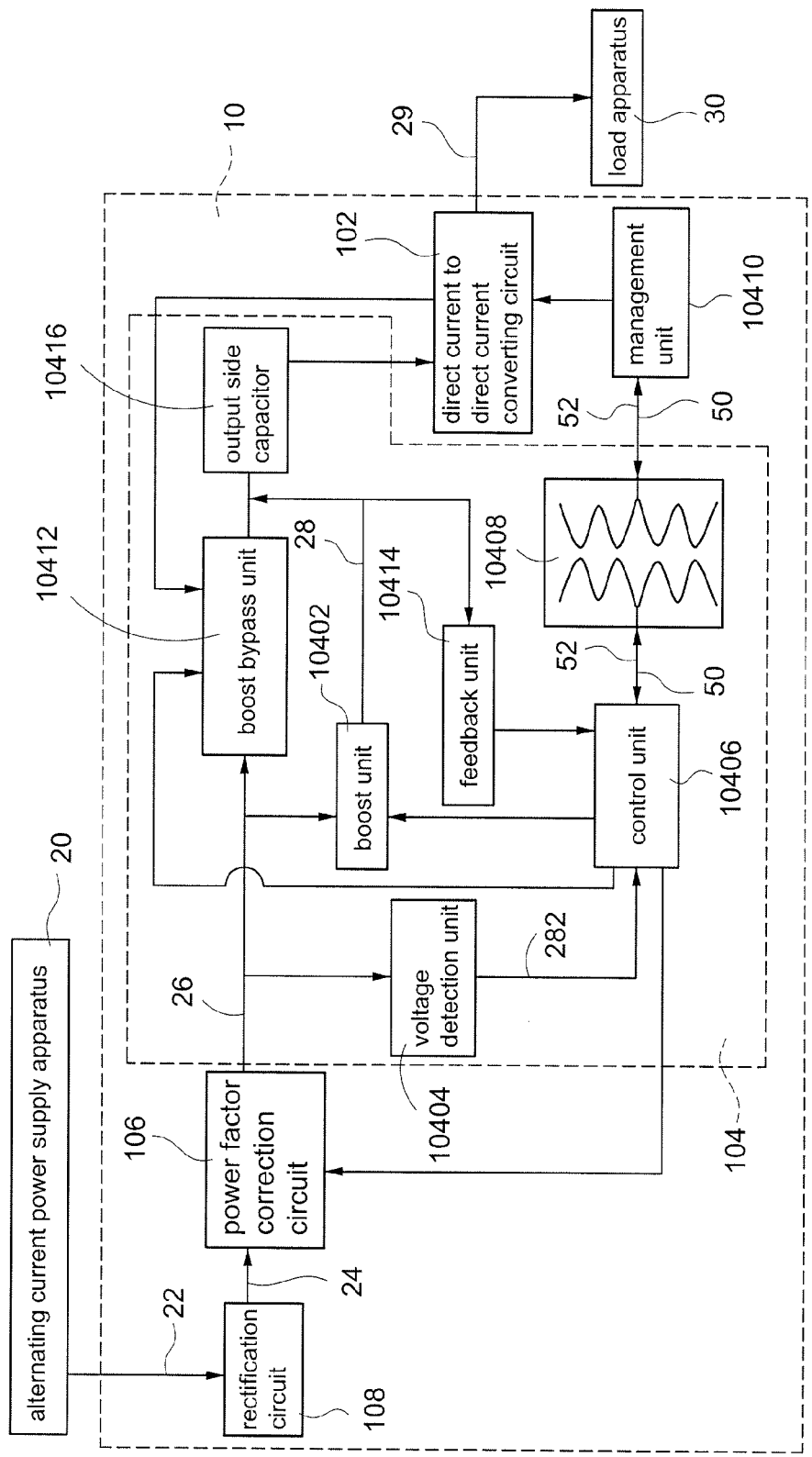
FIG. 1 shows a block diagram of a power supply avoiding an auxiliary boost circuit over voltage of the present invention.

FIG. 1 shows a block diagram of a power supply avoiding an auxiliary boost circuit over voltage of the present invention. A power supply 10 avoiding an auxiliary boost circuit 104 over voltage is applied to an alternating current power supply apparatus 20 and a load apparatus 30. The power supply 10 comprises a direct current to direct current converting circuit 102, the auxiliary boost circuit 104, a power factor correction circuit 106 and a rectification circuit 108. The auxiliary boost circuit 104 comprises a boost unit 10402, a voltage detection unit 10404, a control unit 10406, an isolation unit 10408, a management unit 10410, a boost bypass unit 10412, a feedback unit 10414 and an output side capacitor 10416.

The direct current to direct current converting circuit 102 is electrically connected to the load apparatus 30. The auxiliary boost circuit 104 is electrically connected to the direct current to direct current converting circuit 102. The power factor correction circuit 106 is electrically connected to the auxiliary boost circuit 104. The rectification circuit 108 is electrically connected to the power factor correction circuit 106. The boost unit 10402 is electrically connected to the direct current to direct current converting circuit 102 and the power factor correction circuit 106. The voltage detection unit 10404 is electrically connected to the power factor correction circuit 106 and the boost unit 10402. The control unit 10406 is electrically connected to the power factor correction circuit 106, the boost unit 10402 and the voltage detection unit 10404. The management unit 10410 is electrically connected to the direct current to direct current converting circuit 102. The output side capacitor 10416 is electrically connected to the direct current to direct current converting circuit 102 and the boost unit 10402. The boost bypass unit 10412 is electrically connected to the direct current to direct current converting circuit 102, the power factor correction circuit 106, the boost unit 10402, the voltage detection unit 10404 and the control unit 10406. The feedback unit 10414 is electrically connected to the direct current to direct current converting circuit 102, the boost unit 10402, the control unit 10406 and the boost bypass unit 10412.

The direct current to direct current converting circuit 102 outputs a direct current electric power 29. The direct current to direct current converting circuit 102 comprises a primary side and a secondary side. The control unit 10406 is arranged in the primary side. The management unit 10410 is arranged in the secondary side. The control unit 10406 is electrically connected to the management unit 10410 through the isolation unit 10408.

The alternating current power supply apparatus 20 sends an alternating current power 22 to the rectification circuit 108. The rectification circuit 108 rectifies the alternating current power 22 to obtain a direct current power 24. The rectification circuit 108 sends the direct current power 24 to the power factor correction circuit 106. The power factor correction circuit 106 processes the direct current power 24 to obtain an output voltage 26. The voltage detection unit 10404 detects the output voltage 26 to obtain a detection signal 282. The voltage detection unit 10404 sends the detection signal 282 to the control unit 10406.

When the voltage detection unit 10404 detects that the output voltage 26 of the power factor correction circuit 106 is less than a predetermined voltage, the control unit 10406 enters a hold up time mode to drive the boost unit 10402 to increase the output voltage 26 to obtain a boost voltage 28. The output side capacitor 10416 receives the boost voltage 28 to supply power to the direct current to direct current converting circuit 102. Before the hold up time mode is finished, the control unit 10406 sends a first synchronization signal 50 to the management unit 10410 through the isolation unit 10408. After the control unit 10406 sends the first synchronization signal 50 to the management unit 10410 through the isolation unit 10408, the auxiliary boost circuit 104 covers (namely, prohibits or stops) a function of the isolation unit 10408 (namely, sending signals from the control unit 10406 to the management unit 10410 is stopped), so that the isolation unit 10408 only has a transmission signal function (namely, only sending signals from the management unit 10410 to the control unit 10406 is available).

After the management unit 10410 receives the first synchronization signal 50, the management unit 10410 sends back a second synchronization signal 52 to the control unit 10406 through the isolation unit 10408. After the control unit 10406 receives the second synchronization signal 52 sent from the management unit 10410, the control unit 10406 turns off the boost unit 10402 before or at the same time the management unit 10410 turns off the direct current to direct current converting circuit 102 (namely, stops the boost unit 10402 and the direct current to direct current converting circuit 102 outputting energy).

When the output voltage 26 is greater than or equal to the predetermined voltage, the control unit 10406 turns on the boost bypass unit 10412 and turns off the boost unit 10402, so that the output voltage 26 is sent to the direct current to direct current converting circuit 102 through the boost bypass unit 10412. When the output voltage 26 is less than the predetermined voltage, the control unit 10406 turns off the boost bypass unit 10412 and turns on the boost unit 10402, so that the boost unit 10402 boosts the output voltage 26 to obtain the boost voltage 28, and then the boost unit 10402 sends the boost voltage 28 to the direct current to direct current converting circuit 102.

When the management unit 10410 enters a normal work mode, the management unit 10410 detects the direct current electric power 29 of the direct current to direct current converting circuit 102. When the direct current electric power 29 of the direct current to direct current converting circuit 102 is less than a predetermined current, the management unit 10410 sends an informing signal to the control unit 10406. The control unit 10406 drives the power factor correction circuit 106 to increase the output voltage 26. After the output side capacitor 10416 receives the output voltage 26, the output side capacitor 10416 supplies power to the direct current to direct current converting circuit 102.

Figure 2:
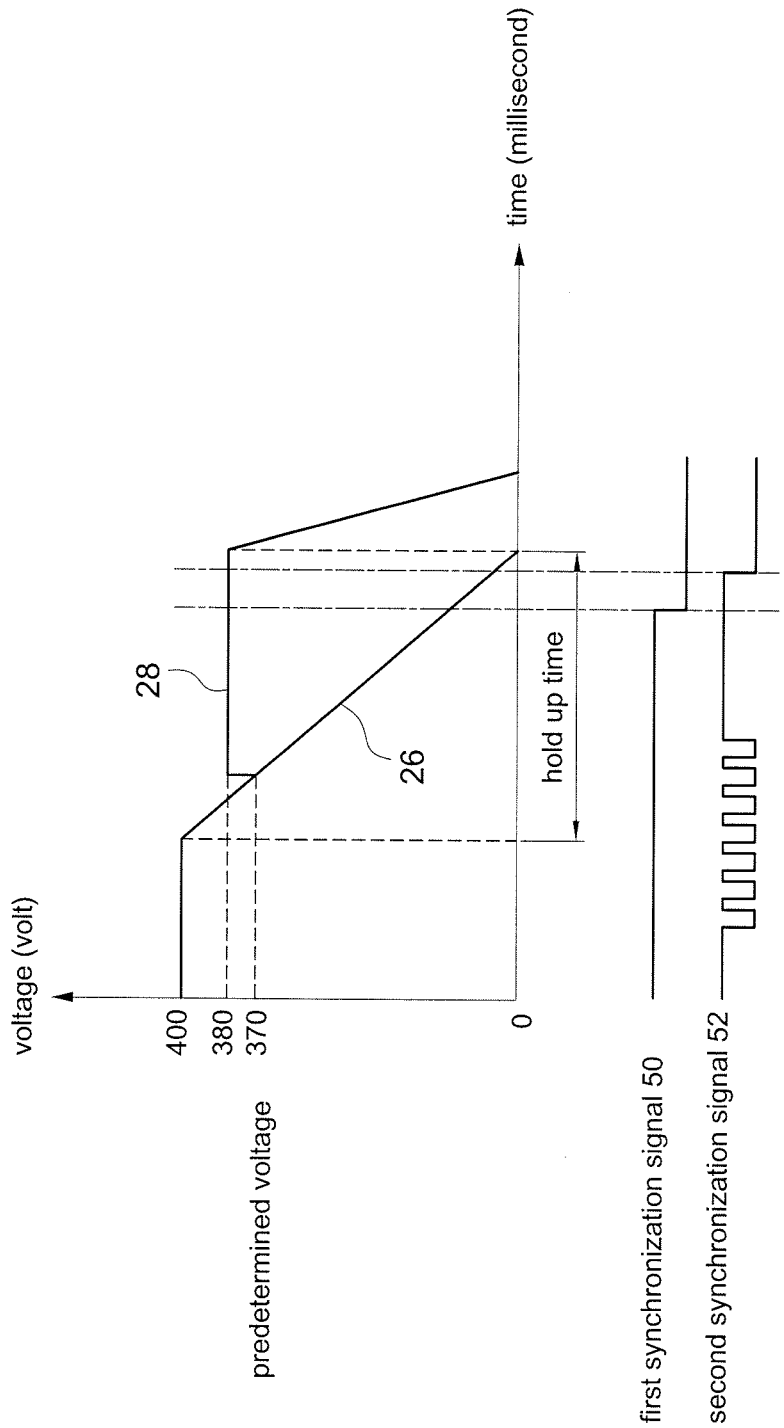
FIG. 2 shows a waveform diagram of an embodiment of the output voltage and the boost voltage of the power supply of the present invention.

FIG. 2 shows a waveform diagram of an embodiment of the output voltage and the boost voltage of the power supply of the present invention. Please refer to FIG. 1 at the same time. When the alternating current power supply apparatus 20 supplies the alternating current power 22 normally, the output voltage 26 is a 400 volts direct current power.

When the output voltage 26 is greater than or equal to the predetermined voltage, the control unit 10406 turns on the boost bypass unit 10412 and turns off the boost unit 10402, so that the output voltage 26 is sent to the direct current to direct current converting circuit 102 through the boost bypass unit 10412.

When the output voltage 26 is not greater than the predetermined voltage, the control unit 10406 turns off the boost bypass unit 10412 and turns on the boost unit 10402, so that the boost unit 10402 boosts the output voltage 26 to obtain the boost voltage 28, and then the boost unit 10402 sends the boost voltage 28 to the direct current to direct current converting circuit 102. In an embodiment, first, the control unit 10406 turns off the boost bypass unit 10412, and then the control unit 10406 turns on the boost unit 10402, so that the power supply 10 is protected more effectively.

Moreover, after the boost unit 10402 boosts the output voltage 26, the boost unit 10402 boosts the output voltage 26 to obtain the boost voltage 28 (for example 380 volts) and maintains the boost voltage 28 until the output voltage 26 is zero. After the output voltage 26 is zero, the boost voltage 28 decreases to zero with a slope. The boost unit 10402 sends the boost voltage 28 to the direct current to direct current converting circuit 102.

Moreover, the direct current to direct current converting circuit 102 converts the output voltage 26 (the boost voltage 28) into the direct current electric power 29. The direct current to direct current converting circuit 102 sends the direct current electric power 29 to the load apparatus 30.

When the first synchronization signal 50 is changed from high (namely, a high signal) to low (namely, a low signal), the control unit 10406 sends the first synchronization signal 50 to the management unit 10410 through the isolation unit 10408. When the second synchronization signal 52 is changed from high (namely, a high signal) to low (namely, a low signal), the management unit 10410 sends the second synchronization signal 52 to the control unit 10406 through the isolation unit 10408.

The advantage of the present invention is to turns off the auxiliary boost circuit and the direct current to direct current converting circuit at the same time. Or the auxiliary boost circuit is turned off first, and then the direct current to direct current converting circuit is turned off. Therefore, the over voltage phenomenon of the auxiliary boost circuit is eliminated, so that the reliability of the power supply is improved.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A power supply avoiding an auxiliary boost circuit over voltage, the power supply comprising:
   a direct current to direct current converting circuit outputting a direct current electric power;
   the auxiliary boost circuit electrically connected to the direct current to direct current converting circuit;
   a power factor correction circuit electrically connected to the auxiliary boost circuit; and
   a rectification circuit electrically connected to the power factor correction circuit,
   wherein the auxiliary boost circuit comprises:
   a boost unit electrically connected to the direct current to direct current converting circuit and the power factor correction circuit;
   a voltage detection unit electrically connected to the power factor correction circuit and the boost unit;
   a control unit electrically connected to the power factor correction circuit, the boost unit and the voltage detection unit;
   a management unit electrically connected to the direct current to direct current converting circuit; and
   an output side capacitor electrically connected to the direct current to direct current converting circuit and the boost unit,
   wherein when the voltage detection unit detects that an output voltage of the power factor correction circuit is less than a predetermined voltage, the control unit enters a hold up time mode to drive the boost unit to increase the output voltage to obtain a boost voltage; the output side capacitor receives the boost voltage to supply power to the direct current to direct current converting circuit; before the hold up time mode is finished, the control unit sends a first synchronization signal to the management unit; after the management unit receives the first synchronization signal, the management unit sends a second synchronization signal to the control unit; after the control unit receives the second synchronization signal sent from the management unit, the control unit turns off the boost unit before or at the same time the management unit turns off the direct current to direct current converting circuit.

2. The power supply in claim 1, wherein the auxiliary boost circuit further comprises:
   a boost bypass unit electrically connected to the direct current to direct current converting circuit, the power factor correction circuit, the boost unit, the voltage detection unit and the control unit,
   wherein when the output voltage is greater than or equal to the predetermined voltage, the control unit turns on the boost bypass unit and turns off the boost unit, so that the output voltage is sent to the direct current to direct current converting circuit through the boost bypass unit;
   wherein when the output voltage is less than the predetermined voltage, the control unit turns off the boost bypass unit and turns on the boost unit, so that the boost unit boosts the output voltage to obtain the boost voltage, and then the boost unit sends the boost voltage to the direct current to direct current converting circuit.

3. The power supply in claim 2, wherein the auxiliary boost circuit further comprises:
   a feedback unit electrically connected to the direct current to direct current converting circuit, the boost unit, the control unit and the boost bypass unit.

4. The power supply in claim 3, wherein the auxiliary boost circuit further comprises:
   an isolation unit,
   wherein the direct current to direct current converting circuit comprises a primary side and a secondary side; the control unit is arranged in the primary side; the management unit is arranged in the secondary side; the control unit is electrically connected to the management unit through the isolation unit.

5. The power supply in claim 2, wherein when the management unit enters a normal work mode, the management unit detects the direct current electric power of the direct current to direct current converting circuit; when the direct current electric power of the direct current to direct current converting circuit is less than a predetermined current, the management unit sends an informing signal to the control unit; the control unit drives the power factor correction circuit to increase the output voltage; after the output side capacitor receives the output voltage, the output side capacitor supplies power to the direct current to direct current converting circuit.

\* \* \* \* \*